H. E. BEIGHLEE.
COMPENSATING PYROMETER SYSTEM AND APPARATUS.
APPLICATION FILED MAY 10, 1912.
1,327,800. Patented Jan. 13, 1920.
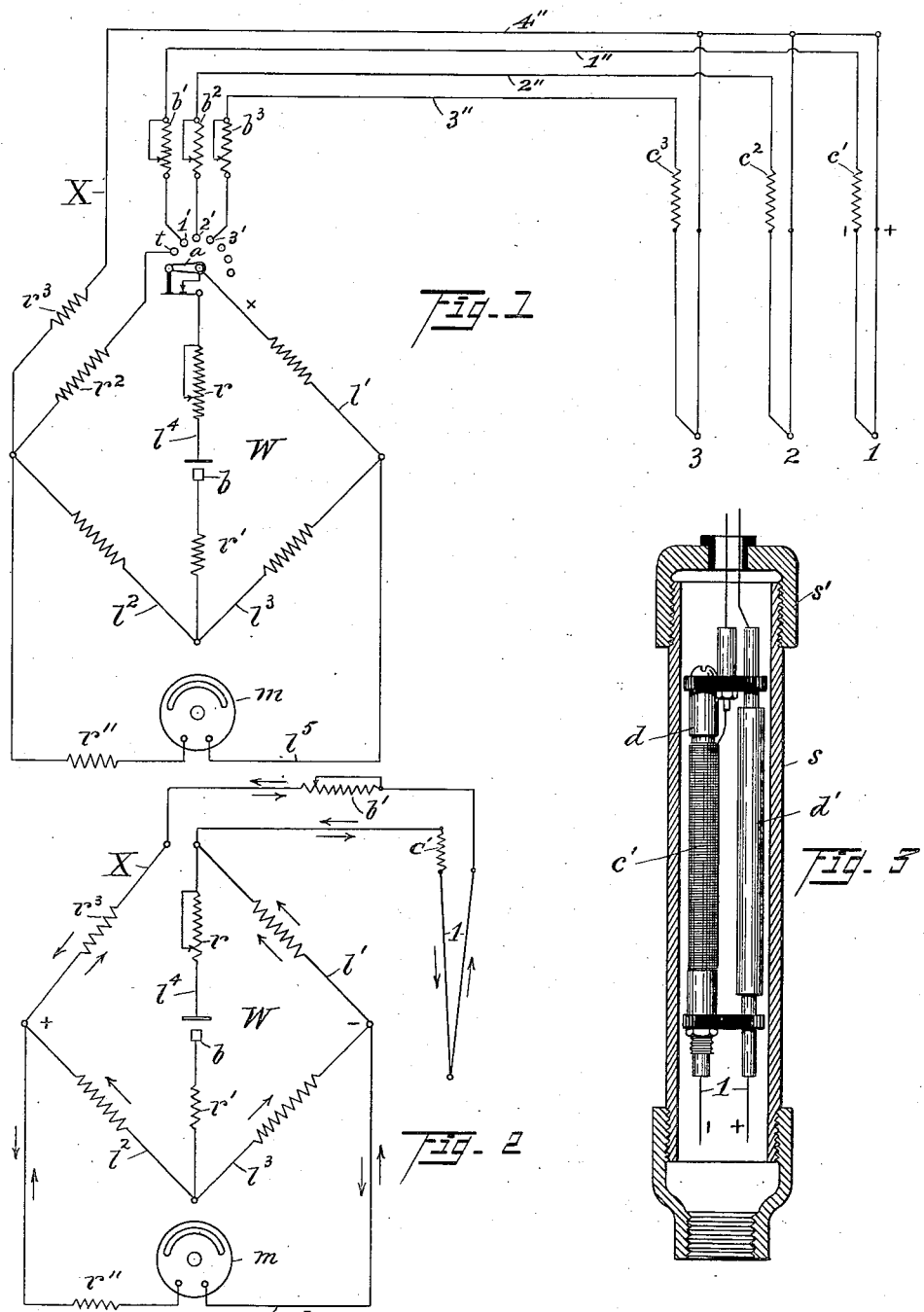

UNITED STATES PATENT OFFICE.

HENRY EARL BEIGHLEE, OF CLEVELAND, OHIO, ASSIGNOR, BY MESNE ASSIGNMENTS, TO THE CLEVELAND INSTRUMENT COMPANY, OF CLEVELAND, OHIO, A CORPORATION OF OHIO.

COMPENSATING-PYROMETER SYSTEM AND APPARATUS.

1,327,800.

Specification of Letters Patent.

Patented Jan. 13, 1920.

Application filed May 10, 1912. Serial No. 696,521.

*To all whom it may concern:*

Be it known that I, HENRY EARL BEIGHLEE, a citizen of the United States, residing at Cleveland, in the county of Cuyahoga and State of Ohio, have invented certain new and useful Improvements in Compensating-Pyrometer Systems and Apparatus, of which the following is a specification.

My invention relates to improvements in compensating pyrometer systems, and has for its object the automatic correction or compensation of errors due to the difference in temperature, inherent in thermo-electric systems of this character.

It is well known that the variation in temperature of the cold junction of a thermo-electric couple, necessarily varies the generated current in such couple, thereby rendering the readings inexact or necessitating computations which will effect more or less accurately, the required correction of the actual reading. It is possible under laboratory conditions, of course, to avoid such computations, but in practice, the thermo-electric couple, while otherwise exceptionally well adapted for the measurement of high temperatures, has been discarded, except in systems wherein an approximate indication of the temperature is satisfactory.

Because of the inherent advantages, however, I have sought to perfect a thermo-electric pyrometer system, which will prove adaptable to commercial conditions and furnish accurate, automatically compensating readings under ordinary working conditions. Accordingly, I have associated with the cold junction of each thermo-electric couple, a resistance-member having a high temperature coefficient, to control the flow of a predetermined source of current, preferably connected across the diagonal of a Wheatstone bridge, opposite to the connection of a calibrated milli-voltmeter. Thus, the thermo-electric couple and its compensating coil, form a part of the variable or X arm of the Wheatstone bridge, and at a given temperature of the cold junction, the milli-voltmeter will, of course, accurately record the electrical pressure, and its calibration will be such as to indicate correctly the temperature of the hot junction. Under these conditions, the predetermined source of current in the bridge is without effect, but my system is so designed that a change in the temperature of the cold junction, will cause the diversion of the proper flow of current to compensate for the change in temperature.

My invention may be more readily explained in connection with the accompanying drawings, diagrammatically illustrating a system connected and constructed in accordance with my invention, as shown in Figure 1, while Fig. 2 is a simplified diagram, better illustrating the flow of the electric currents in said system. Fig. 3 shows the cold-junction box, partially broken away. Throughout the diagrams, I have employed the same character of reference to indicate similar parts.

In explanation of the diagrams, 1, 2 and 3 may be assumed to be thermo-electric couples, which generate the currents furnishing the basis for measurement in said system, and which are respectively connected with the corresponding contacts $1'$, $2'$, $3'$, controlling the circuit through the Wheatstone bridge, W. These thermo-electric couples, in the system which I have selected for illustration, are respectively inserted in furnaces wherein carbon products are burned and the temperature approximates 1100° C. Compensating coils $c'$, $c^2$, $c^3$, are respectively connected at the cold junctions of said thermo-electric couples, in series relation with their line conductors $1''$, $2''$, $3''$.

The thermo-electric couples may be of any suitable dissimilar metals, although in the system described, I have employed two conductors respectively formed of nickel-chromium and nickel-copper alloys, suitably protected and insulated in a well known manner, which need not be described. The compensating coils are composed of commercially pure copper wire of 30 ohms resistance. A balancing resistance for each line approximating 5 ohms, is connected at $b'$, $b^2$, and $b^3$. Each balancing resistance is permanently adjusted when installing the system, so that the total resistance will be 35 ohms.

Considering the Wheatstone bridge proper, the X limb thereof, which alternatively includes, as well, any one of the thermo-electric couples, comprises a 40 ohms resistance coil $r^3$, and in consequence, the opposing limb $l'$ of said bridge is fixed at 75 ohms to balance the normal resistance of a line and said X limb. The balanced resistances in limbs $l^2$, $l^3$, of the bridge, are of 500 ohms resistance.

In the diagonal branch $l^4$ of said bridge, there are connected an adjustable resistance $r$ of approximately 200 ohms, a fixed resistance $r'$ of 500 ohms, and a source of current $b$, which may well be a single cell of dry battery. A switch-arm $a$ is adapted normally to open the branch $l^4$ at contact $a'$; said switch-arm being designed, however, to engage the successive contacts, controlling the bridge-circuits. Contact $t$ is connected with an alternative branch containing a fixed resistance $r^2$ of 200 ohms, employed for the purpose of testing and standardization, as will be later described. Connected across the other diagonal branch of the Wheatstone bridge, is a milli-voltmeter $m$, which preferably is calibrated in heat-units, for indicating the range of temperatures to which the thermo-electric couples are subjected, as 100° to 1200° C. This instrument necessarily is of high resistance;—being some 450 ohms resistance in the system under consideration.

With the exception of the compensating coils $c'$, $c^2$, $c^3$, all of the resistance coils employed in my pyrometer system, must consist of conductors having a negligible temperature coefficient, such as resistance wires drawn from the well known constantan alloy.

The foregoing values have been determined from practical experience to be exceptionally well adapted for securing accurate results within less than 2° C. + or — variation from the actual temperature, throughout the range indicated. Experiments have shown that these values arbitrarily fixed above, may be varied, without affecting the accuracy of the compensating action. I am aware that mathematical computations may be resorted to, for determining these values and indicating the adjustments, now to be explained, but in practice, I have found that such adjustments are preferable, and the controlling principle may be very readily deduced from the concrete example herein explained.

A very important reason for calibrating and adjusting, instead of accurately computing a system of this character, is that the adjustment may take place under approximate working conditions, and therefore affords automatic compensation for different minor sources of error in the particular system subjected to adjustment and calibration.

Before explaining such calibration, it will be desirable to consider the structural features of my improved cold-junction box which also comprises the associated compensating-coil. A metal casing or shell $s$ closed at one end by a screw-cap $s'$, incloses the two insulated brass blocks $d$ $d'$ forming terminals respectively, for the two members of the thermo-electric couple.

One of said blocks $d$ is shaped to form a spool or core for the compensating coil $c'$, comprising 30 ohms of insulated copper-wire wound directly thereon. The line-conductors 1″ 4″ are respectively connected to said blocks $d$ $d'$. These terminal blocks are seen to be of relatively large mass, as compared with the wires or conductors forming a couple, and said blocks are so constructed as to afford equivalent heat-radiating or absorbing properties. Moreover, the compensating-coil and the terminals of the couple are subjected to identical thermal conditions by reason of mounting the said coil upon the terminal-block $d$. Thus, the cold-junction, which in my system includes the associated compensating coil, is protected against sudden fluctuations in temperature by the inclosing casing and the relatively massive terminals.

Accordingly, I may now explain how said system, including each of the thermo-electric circuits, is calibrated and adjusted in practice. Each of the thermo-electric couples, its compensating-coil and line-circuit are so constructed as to duplicate the others employed in the system. One of said couples and its compensating-coil are connected through the line-circuit with the Wheatstone bridge, and the cold-junction is maintained at a constant known temperature, as 24° C. The hot-junction is then successively subjected to increasing temperature throughout the entire range of the milli-voltmeter $m$, and said instrument is accurately calibrated for the different temperatures, as in ordinary laboratory practice.

The hot-junction, in turn is then maintained at some constant temperature, as 1000° C. and the cold-junction is successively raised in temperature from an assumed normal temperature, let us say 24° C. to the boiling point; preferably by immersing the parts in a water bath. This, naturally, results in a reduced flow of current and an incorrect temperature reading, by reason of the increased resistance in the compensating-coil, and the decreased electro-motive force of the couple. By adjusting the variable resistance $r$, however, sufficient current from battery $b$ is permitted to flow through the bridge circuits and connected line circuit, to obtain the correct reading, with varying temperatures of the cold-junction. The correctness of the adjustment may then be tested by maintaining the hot-junction at a different temperature, as 500° C. and varying the temperature of the cold junction, as before. It will be found that the varying resistance of the compensating-coil affords automatic means for permitting sufficient current to flow from the battery, to correct both components of error induced by temperature changes at the cold-junction.

Having accurately adjusted the battery circuit, the switch-arm $a$ is engaged with test contact $t$, which cuts in the predetermined fixed resistance $r^2$, as of 200 ohms, thereby causing the instrument $m$ to indicate the reading of the battery under standard conditions. This position of the needle is then marked upon the milli-voltmeter $m$ for future comparison and standardization, the same being arbitrary, but may be assumed to indicate 800° C. Thus, the flow of current from battery $b$ may afterward be brought to the standard of initial calibration, by connecting resistance $r^2$ of the bridge in circuit, and adjusting resistance $r$ to secure the arbitrary test reading.

Fig. 2 may be referred to for explaining the principle of my improved system. Therein, the current generated by the thermo-electric couple 1 is directionally indicated by the outer arrows of the diagram, while the flow of battery current is similarly indicated by the interiorly positioned arrows. From this it will be seen that the opposing flow of these currents in the X limb of said bridge, is balanced by the uni-directional flow of current in limb $l'$ thereof. While the standard temperature of 24° C. is maintained at the cold-junction, the battery current will have no effect whatever upon the system. In other words, at the assumed normal condition under which instrument $m$ is calibrated, any of the couples will induce the correct temperature reading. Immediately the temperature of the cold-junction and its associated compensating-coil is increased or diminished, however, this composite element unbalances the bridge and causes the battery $b$ to compensate for the changed thermal condition. Thus, if the temperature falls below 24° C., battery current will be proportionally diverted through diagonal branch $l^5$, in opposition to the pyrometer current and will correct its increased flow by such opposition.

Conversely, if the temperature rises above 24° C., the battery current will proportionally augment the pyrometer current in branch $l^5$, thereby effecting an analogous correction of the temperature reading. From the foregoing it will be understood that while the compensating-coil, having a high temperature coefficient, of itself introduces a marked element of error under varying thermal conditions, it actually serves, when associated with the Wheatstone bridge and battery, as described, to compensate both for its own variation and that of the thermo-electric couple.

It will be noted that the milli-voltmeter $m$ has a relatively high resistance of 450 ohms, this being made up of 60 ohms resistance in its actuating coil and a ballast resistance $r''$ of 390 ohms of wire drawn from constantan alloy, or some alloy having a negligible temperature coefficient. Accordingly, the temperature variations of the instrument and line circuit proper may be disregarded because of the preponderating influence of said ballast resistance. On this account, the best results are attainable only with an indicating instrument of relatively high resistance, as compared with the line and pyrometer circuit.

The importance of the testing contact $t$ and fixed resistance $r^2$, in association with the present system is apparent, since the battery naturally will deteriorate, but may immediately be brought to its standard reading, before any of the temperature readings are taken. In practice, considerable variations will exist at the different cold-junctions, but with my improved system, each individual reading is made self-corrective, thereby avoiding computation or the consideration of the atmospheric temperature. Throughout the specification and claims the cold junction terminals therein referred to are such terminals commonly recognized in the art as are external to the direct or material influence of the measured temperature.

Preferably the compensating coil is mounted upon the negative terminal of the cold-junction, since this side of the couple above described, affords the largest factor of error under variations in temperature. However, it is obvious that the compensating coil may be subdivided, duplicated or otherwise positioned, and still secure the desired compensation. The compensating member is both electrically and thermally connected with the thermo-electric couple at the cold junction, and may be broadly described and claimed as associated therewith in such a manner as will secure compensation in the temperature readings. By thermally connected, I have reference to such conductive relation between the cold-junction, and the compensating coil, as will subject them to substantially the same temperatures, as by bodily positioning the coil upon the terminal itself. These terminals are not subjected to any excessive heat and changes in their temperature, are retarded or made sluggish by the protective casing, which incloses the cold-junction. Accordingly, as used in the claims, "associated" is meant to define both the thermal and electrical connection of the compensating coil with the cold-junction terminal or terminals.

It will be apparent that the details above set forth in explaining a specific embodiment of my improvement, may be materially modified to suit different requirements, without departing from my said invention. Accordingly, I claim as new, and desire to secure by Letters Patent, together with such modifications as may be made by those skilled in the art, the following:—

1. In apparatus of the class described, the combination with a thermo-electric couple, of an associated conductive member having a high temperature coefficient, a source of current controllable thereby, and an electrical measuring instrument adapted to be connected in circuit therewith, substantially as set forth.

2. In apparatus of the class described, the combination with a thermo-electric couple, of an associated conductive member having a high temperature coefficient, a source of current controllable thereby, a Wheatstone bridge-circuit and an electrical measuring instrument adapted to be connected in circuit therewith, substantially as set forth.

3. In apparatus of the class described, the combination with a thermo-electric couple, of a connected electrical conductive member having a high temperature coefficient, a source of current controllable thereby, and an electrical measuring instrument, having a relatively high resistance of negligible temperature coefficient, adapted to be connected in circuit therewith, substantially as set forth.

4. In a compensating pyrometer system, the combination with a thermo-electric couple, of a Wheatstone bridge circuit, an electrical measuring instrument, an independent source of current, all adapted to be electrically connected with said couple, and means for directing the flow of said current to compensate for the variation in temperature at the cold-junction of said couple, substantially as set forth.

5. In a compensating pyrometer system, the combination with a thermo-electric couple, of a Wheatstone bridge circuit, an electrical measuring instrument, a relatively high ballast resistance therefor having a negligible temperature coefficient, an independent source of current, all adapted to be electrically connected with said couple, and means for directing the flow of said current to compensate for the variation in temperature at the cold-junction of said couple, substantially as set forth.

6. In a compensating pyrometer system, the combination with a thermo-electric couple, of a Wheatstone bridge circuit, an electrical measuring instrument, a relatively high ballast resistance therefor having a negligible temperature coefficient, an independent source of current, all adapted to be electrically connected with said couple, and means comprising a member having a relatively high temperature coefficient connected in circuit to direct said current for effecting compensation for differences in temperature at the cold-junction of said couple, substantially as set forth.

7. In a compensating pyrometer system, the combination with a thermo-electric couple, of a compensating coil at the cold-junction thereof having a high temperature coefficient, means for rendering sluggish or gradual in their effect, any changes in temperature at the cold-junction, a connected Wheatstone bridge circuit, an independent source of current therein, and an electrical measuring instrument of relatively high resistance connected with said bridge circuit, substantially as set forth.

8. In a compensating thermo-electric appliance, the combination with a thermo-electric couple, of relatively massive metallic bodies forming the cold-junction terminals thereof, and a compensating coil mounted directly upon one of said bodies, the same having a relatively high temperature coefficient, substantially as set forth.

9. The combination with a thermo-electric couple, of relatively massive metallic cold-junction terminals therefor having substantially equal heat radiating and absorbing properties, of a compensating coil having a relatively high temperature coefficient, associated therewith and connected in series with the couple, and a protective casing for the cold-junction members of the couple, substantially as set forth.

10. In a compensating-coil structure of the class described, the combination with a metallic body adapted to be thermally connected with an electrical appliance, of a compensating-coil wound upon said body comprising a conductor having a relatively high temperature coefficient, and a protective casing for said parts, substantially as set forth.

11. In a compensating-coil for thermo-electric couples, the combination with two relatively massive metallic bodies adapted to form the cold-junction terminals of the couple, of a compensating coil formed of resistance wire having a relatively high temperature coefficient thermally connected therewith, and a protective shell inclosing the parts, substantially as set forth.

12. A compensating system, comprising an electrical measuring instrument adapted to be connected in circuit with an electric appliance, a source of current, and an associated compensating-coil having a high temperature coefficient adapted to control the flow of said current under varying conditions of temperature, substantially as set forth.

13. A self-compensating indicating system, comprising a circuit including a Wheatstone bridge, an independent source of current, a compensating-coil having a relatively high temperature coefficient adapted to control said source of current, and an electrical measuring instrument, substantially as set forth.

14. In apparatus of the class described, the combination with a suitable thermo-electric couple, of cold junction terminals therefor comprising conductive bodies of relatively large mass as compared with the couple, and an inclosing shell or casing for said terminals adapted to maintain them relatively stable in temperature, substantially as set forth.

15. A thermo-electric couple having relatively massive exterior metallic members including a compensating conductor of high temperature coefficient, forming the cold-junction terminals, and a protective casing for said terminals, substantially as set forth.

16. A thermo-electric couple having relatively massive metallic terminals including a compensating conductor of high temperature coefficient, forming the cold-junction for said couple and substantially isolated from the energizing temperature.

In testimony whereof I have duly affixed my signature in the presence of two witnesses.

HENRY EARL BEIGHLEE.

Witnesses:
E. M. NICKELS,
ALBERT LYNN LAWRENCE.